United States Patent [19]

Schuppner, Jr. et al.

[11] 3,966,976

[45] June 29, 1976

[54] FOAM STABLE MALT BEVERAGE

[75] Inventors: Harry R. Schuppner, Jr., El Cajon; John H. Randel, San Diego, both of Calif.

[73] Assignee: Merck & Co., Inc., Rahway, N.J.

[22] Filed: May 27, 1975

[21] Appl. No.: 581,387

[52] U.S. Cl. .............................. 426/329; 426/330.4; 426/592
[51] Int. Cl.² ............................................ A21D 4/00
[58] Field of Search ............... 426/329, 330.3, 654, 426/592, 330.4, 12, 61, 64; 260/209 R

[56] References Cited
UNITED STATES PATENTS

| | | | |
|---|---|---|---|
| 2,758,926 | 8/1956 | Toulmin | 426/329 |
| 3,051,574 | 8/1962 | Segel | 426/329 |
| 3,052,548 | 9/1962 | Nugey | 426/329 |

FOREIGN PATENTS OR APPLICATIONS

| | | | |
|---|---|---|---|
| 704,035 | 2/1965 | Canada | 426/329 |

*Primary Examiner*—Hiram H. Bernstein
*Attorney, Agent, or Firm*—Donald J. Perrella; Hesna J. Pfeiffer; J. Jerome Behan

[57] ABSTRACT

This invention relates to a process for preparing malt beverages having good foam stability and improved lace and cling, and a method of preparing such beverages by adding 5 – 100 ppm of a polysaccharide colloid S-10.

3 Claims, No Drawings

FOAM STABLE MALT BEVERAGE

The term "malt beverages," as used herein, includes such normal foam-forming fermented malt beverages as beer; ale, bock beer, stout, and the like. The users of such fermented malt products desire a product that, when poured into a receptacle, will form a good so-called "head" of foam that will persist or last while the beer is being consumed. A number of malt beverages or beers will produce a relatively good foam immediately after pouring, but the foams so produced are not as persistent as is usually desired by the consumers of such products. In addition, it is desirable that the beer cling to the vessel in an attractive lacy pattern, even despite slight contaminant levels of surfactants or detergents on the glassware.

It is, therefore, an object of this invention to provide a new method of producing malt beverage compositions having good foam stability and good lace and cling.

It is another object of this invention to improve the foam stability of malt beverages.

It is another object of this invention to produce new malt beverage compositions having good foam properties.

It is still another object of this invention to produce new malt beverage compositions that resist foam deterioration when served in containers contaminated with minute amounts of soap, detergents and/or grease.

In accordance with this invention, it has been found that the foam persistence of malt beverages can be improved by adding a small quantity of Polysaccharide S-10 colloid to such a beverage in quantities of 5–100 parts per million.

Still further, it has been found that a fermented malt beverage composition so prepared will produce a desirable foam on pouring that is resistant to deterioration in the presence of minute quantities of receptacle contaminants, such as soap, detergents and/or grease.

The Polysaccharide colloid S-10 useful in the process of this invention is not itself a part of this invention but is claimed and described in copending U.S. Ser. No. 373,724, filed June 26, 1973, in the names of Kang, Veeder, and Richey, assigned to Kelco Company. A published equivalent application, German Pat. No. 2,354,566, filed Oct. 31, 1973 is available to the public. Polysaccharide S-10 is prepared by fermentation of *Erwinia tahitica*, ATCC 21711, in a fermentation medium which contains a carbon source, preferably a hydrolyzed starch, a source of magnesium ions, a source of phosphorus, a source of nitrogen, and water. The incubation temperature is 28°–35°C. The Polysaccharide S-10 is a high molecular weight product containing 97% carbohydrate and 3% protein. It has an acetyl content of about 4.5%. The protein portion is represented by approximately 6 ninhydrin stained compounds. The carbohydrate portion of the product S-10 consists of 39% glucose, 29% galactose, 19% uronic acid, and 13% fucose, having an approximate molar ratio of 3:2:1.5:1, respectively. It has a specific rotation of $[\alpha]_D = +106°$ ($c$ 0.25, water), is essentially insoluble in dimethylsulfoxide, and slightly soluble in acetone and lower alkanols.

The polysaccharide colloid S-10, after recovery from the fermentation mixture, is recovered in dry solid form.

In treating a malt beverage in accordance with this invention, it is preferred to use a 1% solution of a Polysaccharide S-10 colloid. This material should be added to the malt beverage after the fermentation step. Preferably, said material should be added prior to filtering and shortly before the time the beverage is placed in the container in which it is sold by the manufacturer; in other words, before the malt beverage is placed in the can, bottle or keg in which it is sold.

The amount of Polysaccharide S-10 required to improve the foam persistence of a malt beverage to a reasonable degree is small and is of the order of 5 to 100 ppm by weight of the malt beverage to be treated. Preferably, the concentration is in the range of 15 to 40 ppm. Thus, for example, a 1% solution of the S-10 colloid gave improved foam persistence to a thousand ml. sample of a commercial beer when added in an amount of 5 ml.

The advantages of S-10 in malt beverages is evaluated using a calculated Sigma value, representing foam retention. This value is calculated using the Modified Carlsberg Method, as published in the *Methods of Analysis of the American Society of Brewing Chemists*, 6th edition, 1958. The improvements in lace and cling using S-10 were measured by observations of the collapsing beer heads during the Modified Carlsberg testing.

The Sigma value of the beer composition, including S-10 at the level of 40 ppm, was 145. By comparison, untreated beer was 132. When 2 ppm soap contaminated beer was used, the Sigma value of a beer having 40 ppm S-10 was 115, compound with a control value of 95. The higher the value, the better the test, and the more desirable in the final product. Both tests also gave improved lace and cling.

What is claimed is:

1. The method of improving the foam properties of fermented malt beverages which comprises adding to the beverage a quantity of between about 5 to 100 parts per million by the weight of said beverage of the Polysaccharide colloid S-10.

2. The method of claim 1 wherein 15–40 parts per million of S-10 are used.

3. A fermented malt beverage possessing improved foam properties containing Polysaccharide colloid S-10 in the amount of about 5–100 parts per million.

* * * * *